(12) United States Patent
Dovrat et al.

(10) Patent No.: US 11,562,092 B1
(45) Date of Patent: Jan. 24, 2023

(54) LOADING AND MANAGING THIRD-PARTY TOOLS ON A WEBSITE

(71) Applicant: CLOUDFLARE, INC., San Francisco, CA (US)

(72) Inventors: Yair Dovrat, Brussels (BE); Yoav Moshe, Amsterdam (NL)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 17/706,361

(22) Filed: Mar. 28, 2022

Related U.S. Application Data

(60) Provisional application No. 63/265,089, filed on Dec. 7, 2021.

(51) Int. Cl.
*G06F 21/62* (2013.01)
*H04L 9/40* (2022.01)

(52) U.S. Cl.
CPC ...... *G06F 21/6218* (2013.01); *H04L 63/0428* (2013.01)

(58) Field of Classification Search
CPC .......................... G06F 21/6218; H04L 63/0428
USPC ............................................................. 726/1
See application file for complete search history.

(56) References Cited

U.S. PATENT DOCUMENTS

| | | | | |
|---|---|---|---|---|
| 5,933,828 A * | 8/1999 | Eitel | ...................... | H04M 3/523 707/999.102 |
| 5,950,000 A * | 9/1999 | O'Leary | ................... | G06F 8/20 717/113 |
| 7,797,724 B2 * | 9/2010 | Calvin | ................ | G06F 21/6218 726/1 |
| 9,553,918 B1 * | 1/2017 | Manion | .................... | G06F 16/40 |
| 9,948,655 B1 * | 4/2018 | Gerweck | ............... | H04L 63/102 |
| 10,902,135 B1 * | 1/2021 | Silva | ........................ | H04L 63/20 |
| 2011/0277027 A1 * | 11/2011 | Hayton | ................. | G06F 21/554 726/8 |
| 2013/0031598 A1 * | 1/2013 | Whelan | ................. | H04W 12/08 726/28 |
| 2013/0031600 A1 * | 1/2013 | Luna | ................... | G06F 12/1408 726/1 |
| 2013/0031601 A1 * | 1/2013 | Bott | ...................... | H04W 12/08 726/28 |
| 2013/0227078 A1 * | 8/2013 | Wei | ......................... | H04L 67/02 709/224 |
| 2013/0247144 A1 * | 9/2013 | Marshall | ................ | H04L 63/10 726/1 |

(Continued)

*Primary Examiner* — Dant B Shaifer Harriman
(74) *Attorney, Agent, or Firm* — Nicholson De Vos Webster & Elliott LLP

(57) ABSTRACT

Managing the loading of third-party tools on a website is described. Configuration is received for loading the third-party tools. An intermediary server receives a request for a page that is hosted at an origin server. The intermediary server retrieves the page and modifies the page including automatically including a third-party tool manager to the retrieved page. The third-party tool manager includes a set of one or more client-side scripts that, when executed by the client network application, collects and transmits information to the intermediary server for loading the third-party tools. The intermediary server loads the third-party tools based on the received information and the configuration. The intermediary server causes event data to be transmitted to third-party tool servers that correspond with the third-party tools.

16 Claims, 5 Drawing Sheets

(56) References Cited

U.S. PATENT DOCUMENTS

| | | | |
|---|---|---|---|
| 2014/0068704 A1* | 3/2014 | Grewal | G06F 21/85 726/4 |
| 2018/0031049 A1* | 2/2018 | Heitzenrater | F16D 13/58 |
| 2018/0077134 A1* | 3/2018 | Beecham | H04L 67/53 |
| 2019/0138912 A1* | 5/2019 | Modarresi | G06N 5/003 |
| 2019/0281030 A1* | 9/2019 | Isaacson | H04L 63/0838 |
| 2020/0294033 A1* | 9/2020 | Wilson | G06Q 20/0658 |
| 2020/0341605 A1* | 10/2020 | Highman | G06F 40/14 |
| 2021/0075817 A1* | 3/2021 | Stokes | H04L 63/1433 |
| 2021/0211403 A1* | 7/2021 | Robinson | H04L 67/565 |
| 2021/0342522 A1* | 11/2021 | Khorana | H04L 67/561 |
| 2022/0091958 A1* | 3/2022 | Buffone | G06F 11/0793 |
| 2022/0164868 A1* | 5/2022 | Dill | G06Q 40/02 |

* cited by examiner

LOADING AND MANAGING THIRD-PARTY TOOLS ON A WEBSITE

CROSS-REFERENCE TO RELATED APPLICATIONS

This application claims the benefit of U.S. Provisional Application No. 63/265,089, filed Dec. 7, 2021, which is hereby incorporated by reference.

FIELD

Embodiments of the invention relate to the field of websites; and more specifically, to the loading and managing of third-party tools on a website.

BACKGROUND

Websites commonly include third-party tools such as analytics tools, conversion pixels, chat widgets, maps, etc. Tag managers exist that are used to load and manage such third-party tools. A tag manager may include a dashboard that allows a user to configure which tools load and when. An example configuration may be that a first tool loads on pages starting with "/support" and a second tool loads on pages starting with "/store". This configuration is put in a script file (e.g., JavaScript) that is loaded by browsers when visiting that website.

This script file includes all tools and rules and evaluates each rule to determine which tool to execute when. Typically, the script tags of these tools are appended to the DOM of the page which causes the browser to fetch and execute the scripts. Many scripts of third-party tools in turn call one or more other scripts. These scripts commonly collect information and transmit that information to an endpoint on a third-party server.

It is common for websites to have multiple third-party tools running. These tools each query for the information they want and send their collected information to the third-party server. The website can experience a slowdown when many of these tools are running. Further, since most third-party tools ask for remote JavaScript resources, it is difficult for a website operator to keep track of what is being included on their website, and many of these tools call other third-party resources, or redirect HTTP requests to other endpoints. Running third-party scripts exposes a security risk if one of those third-party scripts contains malicious code.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
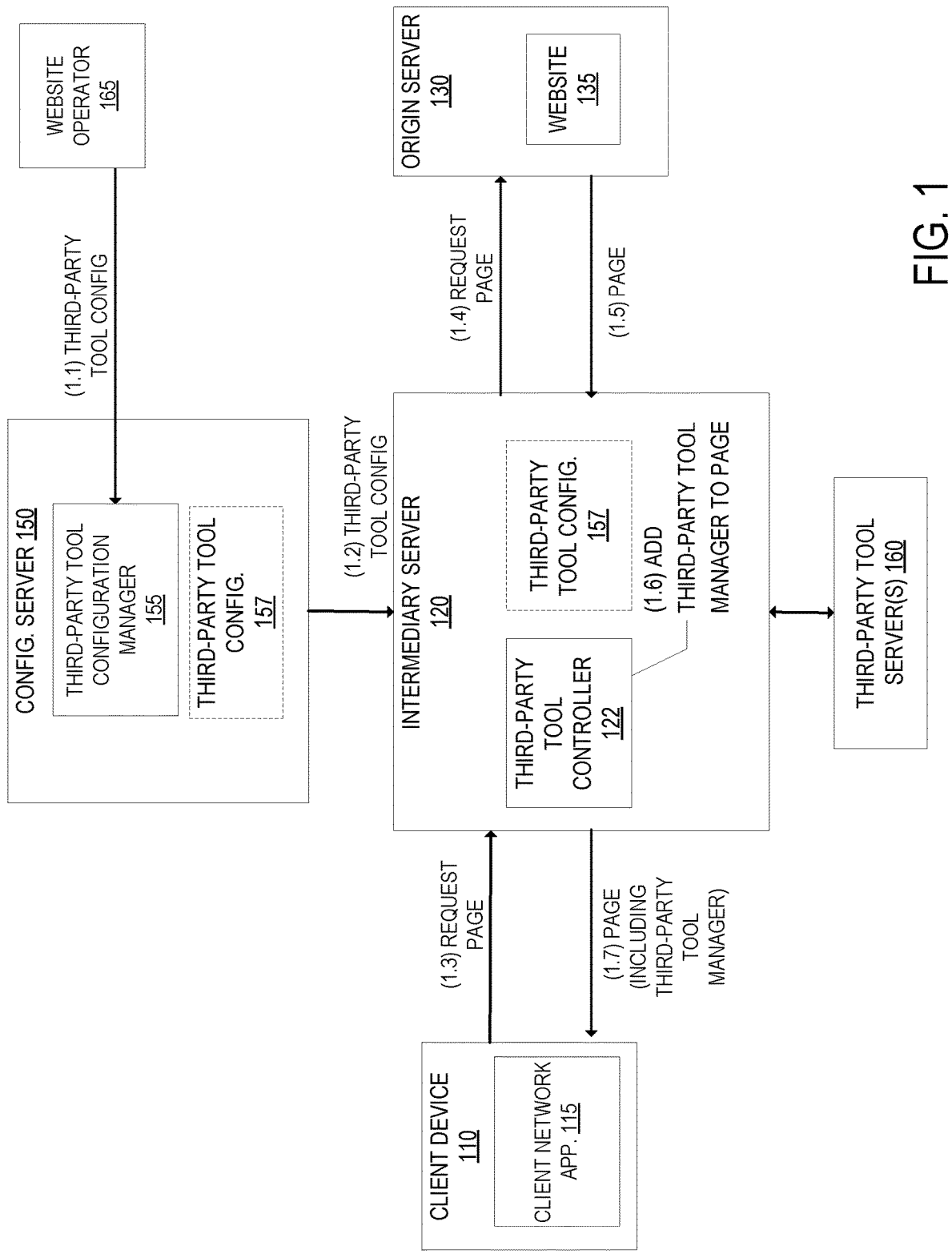
FIG. 1 shows an exemplary system for loading and managing third-party tools on a website according to an embodiment.

Loading and managing third-party tools on a website is described. A website owner or operator uses an interface to configure which one or more of multiple third-party tools to load on the website and optionally settings for loading the one or more third-party tools will load. The third-party tools may be provided by multiple third-party providers. The third-party tools can include analytics tools, conversion pixels, chat tools, widgets, maps, etc. This configuration is saved to a database. A request for a page of the website is received at an intermediary server. The intermediary server retrieves the page, automatically adds a third-party tool manager to the page, and transmits the modified page to the requesting client. The third-party tool manager may include one or more client-side scripts (e.g., JavaScript(s)). The third-party tool manager can be added inline or through a reference to the third-party tool manager (e.g., including script tag(s) that reference the script(s)). The third-party tool manager is operable to, when executed by the client network application, cause information to be transmitted to the intermediary server for loading the third-party tool(s) according to the configuration defined by the website operator. The intermediary server loads the third-party tool(s) based on the received information and according to the configuration defined by the operator. In an embodiment, the third-party tools are loaded entirely remotely from the client (e.g., on the cloud) without any corresponding third-party tool scripts running on the client.

In an embodiment, the received information may be scanned for violations of a data loss prevention (DLP) policy defined in the third-party tool configuration. If there is a violation, the intermediary server takes an action (e.g., remove the offending data, obfuscate the offending data, notify the operator of offending data, log the offense).

In an embodiment, if there is a third-party tool that is configured to be managed by the third-party tool manager and included on the retrieved page, the intermediary server removes or neutralizes that third-party tool such that the client network application does not execute that third-party tool.

The third-party tool manager described herein provides the functionality of the third-party tools to the website without the corresponding third-party scripts from running directly on the client network application. This reduces the security risk involved in using third-party tools. For instance, since the third-party tools are not being directly executed by the client network application but are instead being executed at an intermediary server, the system can scan the code that is being executed and verify that the code has not been tampered with.

Moving the execution of third-party scripts away from the client improves page loading times. For instance, less code is running on the client and less requests are made from the browser. The client does not need to download, parse, and execute these third-party scripts; and does not complete or even block the rendering and/or interactivity of the page.

Further, it also creates an extra layer of security and control over Personal Identifiable Information, Protected Health Information, or other sensitive or unwanted pieces of information that are often unintentionally passed to third-party vendors.

FIG. 1 shows an exemplary system for loading and managing third-party tools on a website according to an embodiment. The system includes a client device 110, an intermediary server 120, an origin server 130, a configuration server 150, and one or more third-party tool servers 160. The client device 110 is a computing device (e.g., laptop, desktop, smartphone, tablet, gaming system, set top box, wearable device, etc.) that is capable of transmitting and receiving network traffic. The client device 110 includes a client network application 115, such as a browser, that accesses network resources. The origin server 130 is a computing device that may serve and/or generate network resources (e.g., web pages, images, word processing documents, PDF files, movie files, music files, or other computer files) for the website 135. The website operator 165 owns and/or operates the website 135.

The intermediary server 120 is a computing device that is situated between the client device 110 and the origin server 130. The intermediary server 120 receives and processes network traffic such as requests for resources of the website 135 hosted at the origin server 130 (e.g., HTTP/s requests/responses, SPDY requests/responses, etc.). In an embodiment, the intermediary server 120 is a reverse proxy server. As will be described in greater detail later herein, the intermediary server 120 manages the loading of third-party tools for a website.

The configuration server 150 includes a third-party tool configuration manager 155 that allows the website operator 165 to configure the loading and managing of one or more third-party tools for the website 135 at operation 1.1. The third-party tools may be provided by multiple third-party providers. The third-party tools can include analytics tools, conversion pixels, chat widgets, maps, etc.

The third-party tool configuration manager 155 may be a dashboard that allows the website operator 165 to select third-party tools from a third-party tool catalog. The functionality of the third-party tool(s) that are selected by the website operator 165 are provided to page(s) of the website 135 without requiring those third-party tool(s) be originally included on the page(s) and/or executed by the client network application. Thus, in an embodiment, third-party scripts of the third-party tools are not executed on the website thereby preventing those scripts from slowing down the website and reducing or eliminating the security risk of loading the third-party scripts on the website.

The third-party tool configuration manager 155 may allow the website operator 165 to configure the settings that apply to each selected third-party tool. The settings may be different for different third-party tools. For example, different third-party tools may have different requirements for sending information. As another example, some third-party tools may require the operator to have an account for that tool or service and provide an account identifier. In such a case the third-party tool configuration manager 155 allows the website operator 165 to provide the account identifier.

The settings may define how and/or when the third-party tool should be loaded by the intermediary server 120. Examples include server-to-server communication loading, optimized script loading, geolocation loading, selective loading, facades, deferring loading, page loading, request bundling, and script inlining The third-party tool loading techniques and timing techniques may be combined.

Regarding server-to-server communication loading, some third-party tools allow information to be sent directly to their third-party tool server, such as through an API or other structured interface for receiving data. This is sometimes referred herein as server-to-server communication. In such a case, the intermediary server 120 may execute the third-party tool and transmit the event information to the third-party server without further interaction with the client network application 115. The intermediary server 120 may adapt the structure of the event information collected from the client network application 115 to the format expected by the third-party tool server. In this case, the client network application 115 does not execute a script of the third-party tool. Not all third-party tools support server-to-server communication. The third-party tool configuration manager 155 may provide the server-to-server communication loading configuration option only for those third-party tool(s) that support server-to-server communication.

Optimized script loading includes the intermediary server 120 mimicking the behavior of the third-party tool including constructing a request with the information to send to the third-party tool server and sending an optimized client-side script to the client network application 115 that, when executed, sends the information to the third-party tool server. This may be done if the third-party server does not support server-to-server communication. Although in this case the client network application 115 executes a script, the client network application 115 does not execute a third-party script. The execution of the optimized client-side script is typically faster than executing the original third-party tool script. For instance, often executing the original third-party tool script includes constructing the URL which may include hashing, encrypting, and/or other intensive computations, which are not performed when executing the optimized client-side script. The third-party tool configuration manager 155 may provide the optimized script loading configuration option to all third-party tools.

The intermediary server 120 may be configured to load different third-party tools and/or versions of third-party tools based on geolocation of the client network application 115 (e.g., based on a mapping of the source IP address of the request to a location, through use of GPS or other geolocation). For instance, the intermediary server 120 may load a version of a third-party tool for clients determined to be in the United States and may load a second version of the third-party tool for clients determined to be outside of the United States. The third-party tool configuration manager 155 may provide the geolocation loading configuration option to all third-party tools.

As another example, the intermediary server 120 may be configured to selectively load a third-party tool for only a certain percentage of visits (e.g., a sampling of a set of visitors). Unlike conventional solutions where the third-party script is delivered to the client network application 115 and parsed by the client network application 115 even when not executed, the intermediary server 120 does not load the third-party tool when it is not needed. The third-party tool configuration manager 155 may provide the selectively loading configuration option to all third-party tools.

The intermediary server 120 may be configured to load a facade of the third-party tool, which is a lighter-weight version of the third-party tool that loads only when the client network application 115 reaches interactivity or upon user activity. A third-party tool facade may be loaded for a widget, such as a chat board, for example. The facade may include what is essential to be displayed, but the functionality of the tool does not load until the page is finished loading or the user tries to interact with the tool. At that point, the third-party tool facade is replaced with the script of the third-party tool. The third-party tool configuration manager 155 may provide the facade loading configuration option to third-party tools that include a visual component on the page.

The intermediary server 120 may be configured to delay loading of a third-party tool until a certain point in the interactivity of the website (e.g., a few seconds after a DOMLoaded event). For instance, the third-party tool may not be loaded until the page has finished loading or upon user activity. In an embodiment, the intermediary server 120 prebuilds any necessary outgoing request(s) and transmits them if the page is exited (e.g., the tab is closed) before the delay window has finished. The third-party tool configuration manager 155 may provide the delay loading configuration option to all third-party tools.

The intermediary server 120 may be configured to load a third-party tool at the page load time. The third-party tool configuration manager 155 may provide the page loading configuration option to all third-party tools.

The intermediary server 120 may be configured to create a single bundled script for the page by fetching required assets (e.g., prefetching those assets) thereby saving the client network application 115 from making separate requests.

The intermediary server 120 may be configured to write the third-party tools inline into the page. The third-party tool configuration manager 155 may provide the inline configuration option to all third-party tools.

The third-party tool configuration manager 155 can allow the operator to define a set of one or more rules that need to apply for the event to be triggered (e.g., the loading of the script). A trigger may be based on an activity occurring on the page. For instance, a trigger may be defined when a particular button is clicked on the page.

The third-party tool configuration manager 155 may allow the website operator 165 to define a custom tool. The custom tool is not a third-party tool. For instance, a custom IMG tag may be created where the custom tool that is being added is using an <img> tag. This is an image (e.g., a pixel) that collects data when the client network application makes a request for that image from a particular URL. As another example, a custom HTML tool may be created when the custom tool that is being added is a <script> tag. The third-party tool configuration manager 155 may allow the operator to define when the tool will be loaded (e.g., deferring, on page load, immediate). The third-party configuration manager 155 may allow the operator to define the trigger for loading the custom tool.

In an embodiment, the third-party tool configuration manager 155 allows the website operator 165 to configure one or more data loss prevention (DLP) rules. Example DLP rules include checking for an email address, name, social security number, phone number, or other personally identifiable information (PII). The third-party configuration manager 155 may allow custom rules to be generated (e.g., using regex). The third-party configuration manager 155 may allow the operator to determine what type of action to take when a DLP rule is violated. For example, the violating information may be obfuscated or removed from the information. As another example, the operator may be notified (e.g., email, text message) upon a violation.

The configuration of the third-party tools (the third-party tool configuration 157) is stored in a data structure that is available to the intermediary server 120. The third-party tool configuration 157 may be stored in a central location, such as the configuration server 150, and queried by the intermediary server 120. Alternatively, the third-party tool configuration 157 may be transmitted to the intermediary server 120. As shown in FIG. 1, the third-party tool configuration is sent to the intermediary server 120 at operation 1.2.

The intermediary server 120 manages the loading of third-party tool(s) for the website 135 according to configuration defined by the website operator 165. The third-party tools can include analytics tools, conversion pixels, chat widgets, maps, etc. A request for a page of the website 135 is received at the intermediary server 120 from the client network application 115 at operation 1.3. The request is received at the intermediary server 120 instead of the origin server 130. For instance, the domain of the page may resolve to an IP address of the intermediary server 120 instead of the origin server 130.

The intermediary server 120 retrieves the page from the origin server 130. For instance, at operation 1.4, the intermediary server 120 transmits a request for the page to the origin server 130 and receives, at operation 1.5, the requested page. The retrieved page may include one or more third-party tools that have been configured by the operator 165 to be loaded by the intermediary server 120. In such cases, the intermediary server 120 may remove those third-party tool(s) and/or cause those third-party tool(s) to not be executed by the client network application 115. In other cases, the retrieved page does not include the one or more third-party tools that have been configured by the operator 165 to be loaded by the intermediary server 120.

At operation 1.6, the third-party tool controller 122 of the intermediary server 120 automatically adds a third-party tool manager to the page that is operable to, when executed by the client network application 115, cause information to be transmitted to the intermediary server 120 for loading the third-party tool(s) according to the configuration defined by the website operator 165. For instance, the third-party tool manager may be added to the head of the page (e.g., within the <head> element of the page). The information may include information collected from the client device 110 and/or the client network application 115 that is not included in HTTP requests or cannot be derived from HTTP requests (e.g., screen resolution, viewport size).

The information may include event information such as if a certain configured interaction occurred with the page (e.g., a particular button was clicked). The third-party tool manager may include one or more client-side scripts (e.g., JavaScript(s)). The third-party tool manager can be added inline and/or through a reference to the third-party tool manager (e.g., including script tag(s) that reference the script(s)). Prior to adding the third-party tool manager to the page, the third-party tool controller 122 may dynamically generate the third-party tool manager if it does not exist in cache available to the intermediary server 120. The third-party tool controller 122 may dynamically generate the third-party tool manager depending on the third-party tool configuration 157, and the resulting third-party tool manager may be different for different client network applications.

At operation 1.7, the intermediary server 120 transmits the requested page that includes the third-party tool manager to the client network application 115 of the client device 110. The client network application 115 executes the third-party tool manager.

Figure 2:
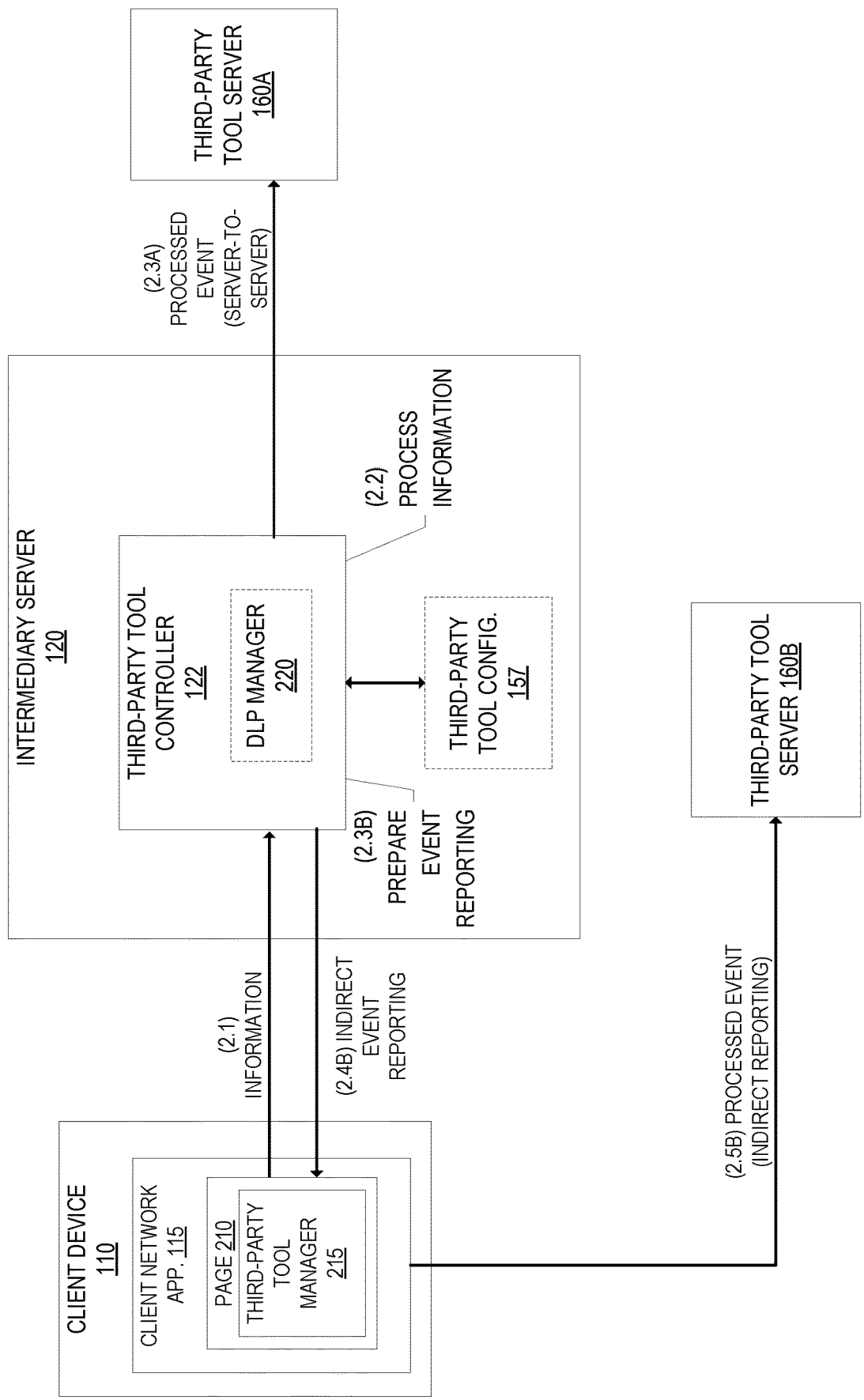
FIG. 2 illustrates an exemplary system for loading and managing third-party tools on a website according to an embodiment.

FIG. 2 illustrates an exemplary system for loading and managing third-party tools on a website according to an embodiment. The operations of FIG. 2 occur after the operations of FIG. 1. In the example of FIG. 2, the client network application 115 has received the page 210 that includes the third-party tool manager 215 from the intermediary server 120. The third-party tool manager collects information for loading the configured third-party tools and transmits the information to the intermediary server 120 (e.g., the third-party tool controller 122). The third-party tool manager may collect information from the client device 110 and/or the client network application 115 that is not included in HTTP requests or cannot be derived from HTTP requests. For instance, the third-party tool manager may determine the screen resolution of the client device 110 and/or the client network application 115 if one of the tools configured for the website requires the screen resolution to operate correctly. The third-party tool manager may also collect information from the client device 110 and/or the client network application that is included in HTTP requests or derived from HTTP requests. The information may include event information such as if a certain configured interaction occurred with the page (e.g., a particular button was clicked). This information may be used during execution of third-party tools. As shown in FIG. 2, the third-party tool manager 215 transmits the information at operation 2.1 to the third-party controller 122.

The third-party tool controller 122 receives and processes the information at operation 2.2. The third-party tool controller 122 determines, based on the third-party tool configuration 157 and the received information, what third-party tools to load and the settings for loading the tools. In an embodiment, the third-party controller 122 may also, using the DLP manager 220, scan the data for any violations of a DLP policy defined in the third-party tool configuration 157 and take the defined actions if there is a violation (e.g., remove the offending data, obfuscate the offending data, notify the operator of offending data, log the offense). The DLP manager 220 may analyze the request URL of the event information to determine if there is a violation of a DLP policy. The DLP manager 220 may analyze the content of the data (e.g., form data) to determine if the content includes a violation of a DLP policy. The DLP manager 220 may mask or obfuscate IP address information that is included in the received data.

The execution of some third-party tools may be completed by the intermediary server 120 without further interaction from the client network application 115. For example, if a third-party tool server 160 supports server to server communication, the intermediary server 120 can transmit the information directly to that third-party tool server 160. In the example of FIG. 2, the third-party tool server 160A supports server-to-server communication for a third-party tool that is loaded by the third-party tool controller 122. The third-party tool controller 122 can transmit the processed event information for that third-party tool to the third-party tool server 160A at operation 2.3A, without further interaction from the client network application 115.

If server to server communication is not supported or not configured for a particular third-party tool, the intermediary server 120 may construct a URL to which the client network application 115 is to transmit the information, and an optimized client-side script that replicates the functionality of the original client-side script. In the example of FIG. 2, the third-party tool controller 122 prepares the event reporting including constructing the URL at operation 2.3B and transmits the optimized client-side script to the client network application 115 at operation 2.4B. The optimized client-side script is configured to, when executed, cause the client network application 115 to transmit the processed event information to the third-party tool server 160B at operation 2.5B. The client network application 115 executes the optimized client-side script to send the information to the third-party tool server 160B.

The third-party tool manager may also control how the third-party tools are loaded based on triggers, which may be defined by the customer. Trigger evaluation may occur on the third-party tool manager and/or the intermediary server 120. A trigger may be based on an activity occurring on the page. For instance, a trigger may be defined when a particular button is clicked on the page. Upon the activity occurring, in an embodiment the third-party tool manager transmits the indication of the activity to the intermediary server 120 and any other required information. The intermediary server 120 executes the third-party tool(s) associated with the trigger. Executing the third-party tool(s) is based on the third-party tool configuration 157 and the information, including whether to filter the data. Executing the third-party tool(s) may include transmitting the event information directly to the third-party tool server or causing the client to transmit the information to the third-party tool server as previously described.

Although embodiments have been described where a third-party tool manager is added to the page for managing the loading of third-party tools, in some cases the third-party tool manager is not included in the page. For instance, a third-party tool (or custom tool) may collect event information from the request itself or that can be derived from the request. For instance, the intermediary server 120 may receive a request for the page and use the information in the request for the third-party tool (e.g., page view, visit).

To provide an example of loading a third-party tool, consider the loading of a tracking pixel third-party tool that tracks page views that relies on cookies. When a client network application accesses a website that is configured to include the tracking pixel, the third-party tool controller 122 of the intermediary server 120 automatically adds a third-party tool manager to the page that is operable to provide information for loading the tracking pixel. For instance, the third-party tool manager may collect information about the visit such as the page visited, the type of client network application, the type of device, any cookies that are set, etc. The third-party tool controller 122 determines whether a cookie is included for the tracking pixel. If such a cookie is included, and assuming that the third-party tool server supports server-to-server communication, the third-party tool controller 122 transmits the page view event with the cookie value to the third-party tool server of the tracking pixel third-party tool. If such a cookie is not included, the third-party tool controller 122 generates an optimized version of the tracking pixel third party tool script and transmits it to the client network application 115. The optimized version of the tracking pixel third-party tool script may be optimized to not be executed by the client network application until the website reaches interactivity or if the user exits the website prior to the script executing. When the script executes, a cookie is created and sent to the intermediary server 120. The intermediary server 120 may then transmit the page view event with the cookie value to the third-party tool server.

In an embodiment, the third-party tool controller 122 of the intermediary server 120 is run in a serverless execution environment. For instance, the third-party tool controller 122 may be executed in an execution environment in which a single process can safely run third-party code. The process can contain multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. This execution environment may not be a container or virtual machine. For purposes of description, this type of execution environment is sometimes referred herein as an isolated execution environment. In a specific implementation, the execution environment is an isolate of the V8 JavaScript engine. In an embodiment, each third-party tool that is executed by the third-party tool controller is executed in its own isolated execution environment.

Figure 3:
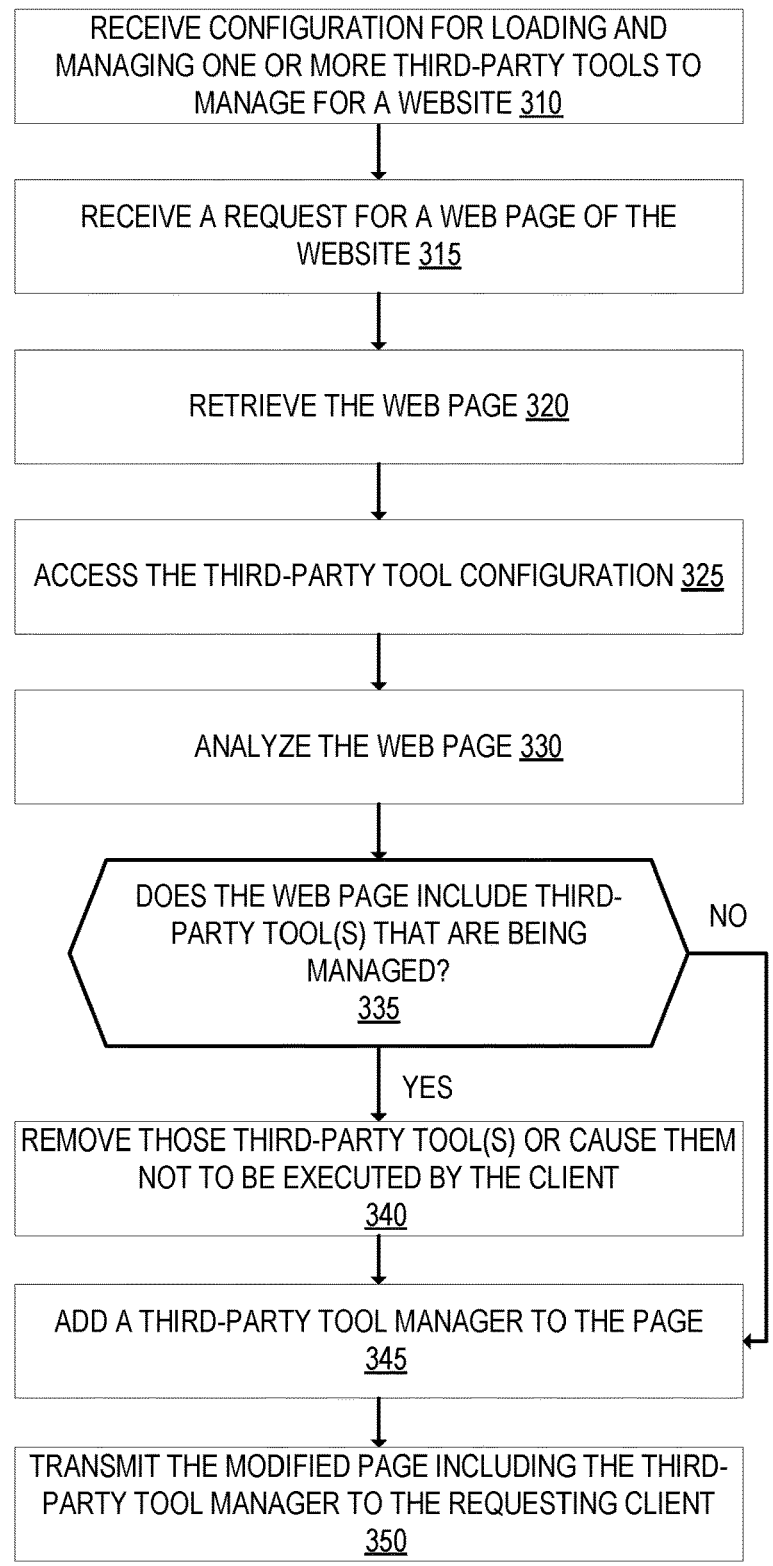
FIG. 3 is a flow diagram that illustrates exemplary operations for managing and loading third-party tools on a website according to an embodiment.

FIG. 3 is a flow diagram that illustrates exemplary operations for managing and loading third-party tools on a website according to an embodiment. The operations of FIG. 3 and other flow diagrams are described with respect to the exemplary embodiments of FIGS. 1 and 2. However, the exemplary embodiments of FIGS. 1 and 2 can perform operations different from those of FIG. 3 and the other flow diagrams, and the operations of FIG. 3 and the other flow diagrams can be performed by different embodiments from those in FIGS. 1 and 2.

At operation 310, the system receives configuration for loading and managing one or more third-party tools for a website. With respect to FIG. 1, the configuration server 150 receives the configuration from the website operator 165 for the website 135 through use of the third-party tool configuration manager 155. The configuration may be similar to the configuration described with respect to FIG. 1. The configuration is stored in the configuration server 150 and/or the intermediary server 120.

Next, at operation 315, the intermediary server 120 receives a request for a web page of the website 135. The request is received at the intermediary server 120 instead of the origin server 130. Next, at operation 320, the intermediary server 120 retrieves the requested web page. Retrieving the requested web page may include transmitting a request for the page to the origin server 130 and receiving a response including the web page if the web page is not in a cache available to the intermediary server 120. If the web page is in cache available to the intermediary server 120, the web page may be retrieved from the cache.

At operation 325, the intermediary server 120 accesses the third-party tool configuration that is applicable for the requested web page to determine the third-party tool(s) to be loaded for the page. Next, at operation 330, the intermediary server 120 analyzes the web page and determines at operation 335 whether the web page includes third-party tool(s) that are being managed. To say it another way, the intermediary server 120 determines whether the page already includes a third-party tool that has been configured to be managed by the service. If the web page does include such a third-party tool, then at operation 340 the intermediary server 120 removes those third-party tool(s) or causes them to not be executed by the client network application 115 (e.g., changing the script tag so that the third-party tool is not executed). Flow then moves to operation 345. If the web page does not include such a third-party tool, then operation 345 is performed.

At operation 345, the intermediary server 120 adds a third-party tool manager to the page. The third-party tool manager can be added inline or through a reference to the third-party tool manager (e.g., including script tag(s) that reference the script(s) of the third-party tool manager). Prior to adding the third-party tool manager to the page, the intermediary server 120 may dynamically generate the third-party tool manager if it does not exist in cache available to the intermediary server 120. The intermediary server 120 may dynamically generate the third-party tool manager depending on the third-party tool configuration 157, and the resulting third-party tool manager may be different for different client network applications. The third-party tool manager may be a set of one or more client-side scripts that, when executed by the client network application 115, collects and transmits information to the intermediary server 120 for loading the configured third-party tool(s). For example, the information may include information collected from the client device 110 and/or the client network application 115 that is not included in HTTP requests or cannot be derived from HTTP requests (e.g., screen resolution, viewport size). The information may include event information such as if a certain configured interaction occurred with the page (e.g., a particular button was clicked). At operation 350, the intermediary server 120 transmits the modified page including the third-party tool manager to the requesting client network application 115.

In an embodiment, in addition to or in lieu of adding the third-party tool manager to the page, the intermediary server 120 may automatically inject code to the page for triggering event information to be transmitted to the intermediary server 120. For example, based on the configured third-party tools, the intermediary server 120 may analyze the HTML of the page and determine component(s) in which to add a trigger. As an example, if the intermediary server 120 detects a button in the page, the intermediary server 120 may add an event listener (e.g., using CSS selectors) that transmits event information upon that button being clicked. As another example, if the intermediary server 120 detects a form submission in the page, the intermediary server 120 may add code to track the form submissions (e.g., using CSS selectors) to trigger an event when the form is submitted.

Figure 4:
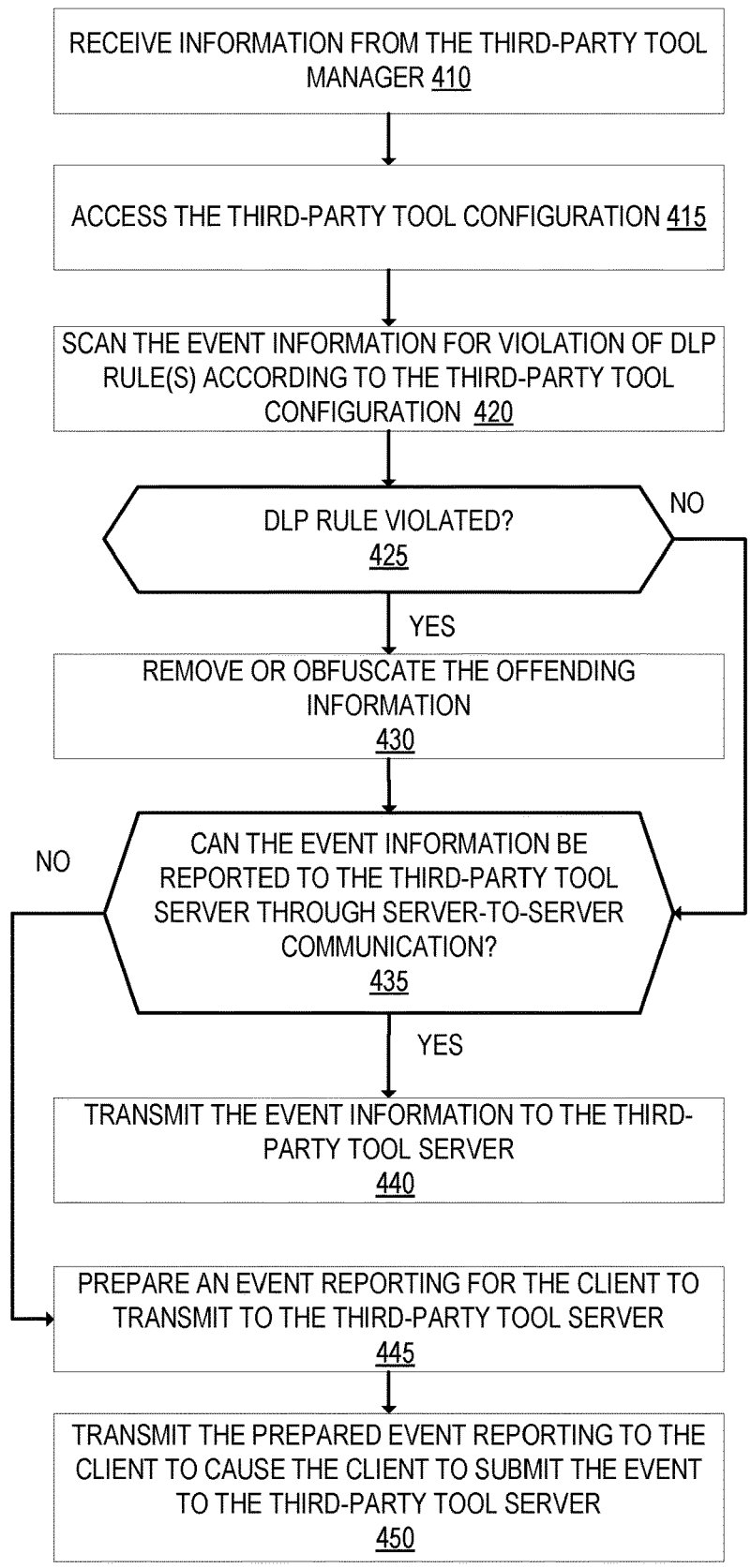
FIG. 4 is a flow diagram that illustrates exemplary operations for loading third-party tools on a website according to an embodiment.

FIG. 4 is a flow diagram that illustrates exemplary operations for loading third-party tools on a website according to an embodiment. The operations of FIG. 4 occur after a third-party manager tool has been transmitted to a client network application. For instance, the operations of FIG. 4 occur after the intermediary server 120 transmits the third-party tool manager to the requesting client network application 115. The client network application 115 executes the third-party tool manager.

At operation 410, the intermediary server 120 receives information from the third-party tool manager that is used for loading the third-party tool(s). The information may include information collected from the client device 110 and/or the client network application 115 that is not included in HTTP requests or cannot be derived from HTTP requests (e.g., screen resolution, viewport size). The information may include event information such as if a certain interaction occurred with the page (e.g., a particular button was clicked).

Next, at operation 415, the intermediary server 120 accesses the third-party tool configuration that is applicable for the requested web page. At operation 420, the intermediary server 120 scans the information received for a violation of a DLP rule included in the third-party tool configuration. Example DLP rules include checking the information for an email address, name, social security number, phone number, or other personally identifiable information (PII). If a DLP rule is determined to be violated at operation 425, then flow moves to operation 430 where the intermediary server 120 removes or obfuscates the violating information. The operator may also be notified (e.g., email, text message) upon a violation and/or the violation logged. Flow then moves to operation 435. If a DLP rule is determined to not be violated at operation 425, then flow moves to operation 435.

The intermediary server 120 executes the configured third-party tool according to the configuration. Executing these third-party tools typically includes sending event data to the third-party tool servers for those tools (e.g., page views, button clicked, etc.). The intermediary server 120 causes the event data to be transmitted to the third-party tool servers. The intermediary server 120 may send information directly to the third-party tool server if that server supports server-to-server communication. If the third-party tool server does not support server-to-server communication or it has not been configured for a particular tool, then the intermediary server 120 may construct the URL to which the client network application 115 is to transmit the information and an optimized client-side script that replicates the functionality of the original client-side script.

At operation 435, the intermediary server determines whether event information for a third-party tool can be transmitted directly to the corresponding third-party tool server. For instance, the intermediary server 120 looks up the configuration for the third-party tool and determines whether the corresponding third-party tool server supports server-to-server communication. If the event information can be transmitted directly, then at operation 440 the intermediary server 120 transmits the event information to the third-party tool server. If the event information cannot be transmitted directly to the third-party tool server, then control moves to operation 445.

At operation 445, the intermediary server 120 prepares an event reporting for the client network application 115 to transmit to the appropriate third-party tool server. For instance, the intermediary server 120 may construct a URL to which the client network application 115 is to transmit the information, and an optimized client-side script that replicates the functionality of the original client-side script. Next, at operation 450, the intermediary server 120 transmits the prepared event reporting to the client network application 115 to cause the client network application 115 to transmit the event to the third-party tool server.

The intermediary server 120 may be part of a distributed cloud computing network that includes multiple data centers that are geographically distributed. Each data center may include one or more intermediary servers, one or more control servers, one or more DNS servers, and one or more other pieces of networking equipment (e.g., routers, switches, hubs, etc.). The intermediary server(s), control server(s), and DNS server(s) may be virtual instances running on the same physical device or may be separate physical devices. The data centers may be geographically distributed which decreases the distance between requesting client devices and content.

In an embodiment, only an intermediary server that is in the same data center to which the client network application 115 connects is permitted to execute the third-party tools for websites accessed by the client network application 115. In such a case, if there is a violation of a DLP rule (e.g., PII information is scrubbed), that information may not be transmitted outside of the data center (or a region to which the data center belongs) to the third-party tool provider.

In an embodiment, the configuration includes a setting that defines a specific geographic location or region in which decryption of HTTPS traffic is permitted to occur.

Figure 5:
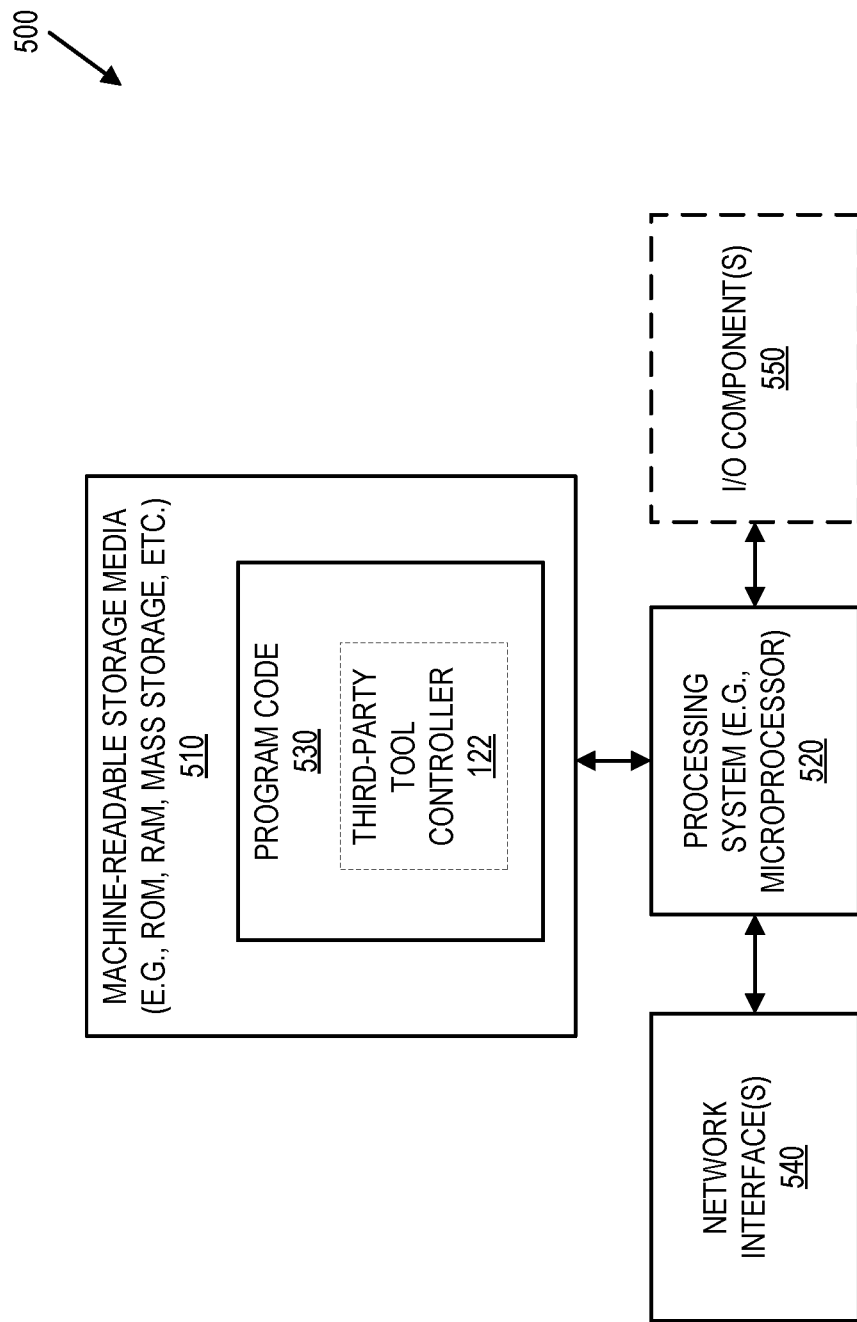
FIG. 5 is a block diagram illustrating a data processing system that can be used in an embodiment.

FIG. 5 illustrates a block diagram for an exemplary data processing system 500 that may be used in some embodiments. One or more such data processing systems 500 may be utilized to implement the embodiments and operations described with respect to the intermediary server 120 and/or the configuration server 150. Data processing system 500 includes a processing system 520 (e.g., one or more processors and connected system components such as multiple connected chips).

The data processing system 500 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 520. For example, the depicted machine-readable storage media 510 may store program code 530 that, when executed by the processor(s) 520, causes the data processing system 500 to execute the third-party controller 122, and/or any of the operations described herein.

The data processing system 500 also includes one or more network interfaces 540 (e.g., a wired and/or wireless interfaces) that allows the data processing system 500 to transmit data and receive data from other computing devices, typically across one or more networks (e.g., Local Area Networks (LANs), the Internet, etc.). The data processing system 500 may also include one or more input or output ("I/O") components 550 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 500, and, in certain embodiments, fewer components than that shown in One or more buses may be used to interconnect the various components shown in FIG. 5.

The techniques shown in the figures can be implemented using code and data stored and executed on one or more electronic devices (e.g., a client device, an intermediary server, a configuration server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding of embodiments. It will be appreciated, however, by one skilled in the art that embodiments can be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving configuration for loading a plurality of third-party tools of a plurality of third-party tool providers for a website, wherein the received configuration includes a data loss prevention rule;
   receiving, at an intermediary server from a client network application of a client device, a request for a page of the website, wherein the web site is hosted at an origin server;
   retrieving, by the intermediary server, the page;
   modifying, by the intermediary server, the retrieved page by automatically including a third-party tool manager to the retrieved page, wherein the third-party tool manager includes a set of one or more client-side scripts that, when executed by the client network application of the client device, transmits information to the intermediary server for loading the plurality of third-party tools;
   receiving, from the client network application via the third-party tool manager, information for loading the plurality of third-party tools;
   scanning the received information and determining that there is a violation of the data loss prevention rule, and responsive to this determination, obfuscating data of the received information that is in violation of the data loss;
   loading the plurality of third-party tools based on the received information including the obfuscated data and the configuration; and
   causing event data to be transmitted to a plurality of third-party tool servers that correspond with the plurality of third-party tools.

2. The method of claim 1, wherein causing event data to be transmitted to at least one of the plurality of third-party tool servers includes the intermediary server transmitting the event data to that third-party tool server using an application programming interface (API) provided by the third-party tool server provider of that third-party tool.

3. The method of claim 1, wherein causing event data to be transmitted to at least one of the plurality of third-party tool servers includes constructing a URL with the event data to be transmitted to that third-party tool server and transmitting an optimized client-side script to the client network application that, when executed by the client network application, transmits the event data to that third-party tool server.

4. The method of claim 1, wherein the page does not include the plurality of third-party tools.

5. The method of claim 1, wherein the received configuration includes a setting that defines a specific geolocation or region in which decryption of traffic is permitted to occur.

6. The method of claim 1, wherein the intermediary server is in a first data center, and wherein the first data center is one of a plurality of data centers that each include a set of one or more intermediary servers, and wherein the received configuration includes a setting that defines that only an intermediary server that is located in a same data center to which the client network application connects is permitted to load the plurality of third-party tools based on the received information and the configuration.

7. The method of claim 1, wherein the received information includes a screen resolution of the client network application.

8. The method of claim 1, wherein the received information is received as a result of a configured interaction occurring with the page.

9. A non-transitory machine-readable storage medium that provides instructions that, if executed by a processor, will cause said processor to carry out operations comprising:
   receiving configuration for loading a plurality of third-party tools of a plurality of third-party tool providers for a website, wherein the received configuration includes a data loss prevention rule;
   receiving, at an intermediary server from a client network application of a client device, a request for a page of the website, wherein the web site is hosted at an origin server;
   retrieving, by the intermediary server, the page;
   modifying, by the intermediary server, the retrieved page by automatically including a third-party tool manager to the retrieved page, wherein the third-party tool manager includes a set of one or more client-side scripts that, when executed by the client network application of the client device, transmits information to the intermediary server for loading the plurality of third-party tools;

receiving, from the client network application via the third-party tool manager, information for loading the plurality of third-party tools;

scanning the received information and determining that there is a violation of the data loss prevention rule, and responsive to this determination, obfuscating data of the received information that is in violation of the data loss;

loading the plurality of third-party tools based on the received information including the obfuscated data and the configuration; and causing event data to be transmitted to a plurality of third-party tool servers that correspond with the plurality of third-party tools.

10. The non-transitory machine-readable storage medium of claim 9, wherein causing event data to be transmitted to at least one of the plurality of third-party tool servers includes the intermediary server transmitting the event data to that third-party tool server using an application programming interface (API) provided by the third-party tool server provider of that third-party tool.

11. The non-transitory machine-readable storage medium of claim 9, wherein causing event data to be transmitted to at least one of the plurality of third-party tool servers includes constructing a URL with the event data to be transmitted to that third-party tool server and transmitting an optimized client-side script to the client network application that, when executed by the client network application, transmits the event data to that third-party tool server.

12. The non-transitory machine-readable storage medium of claim 9, wherein the page does not include the plurality of third-party tools.

13. The non-transitory machine-readable storage medium of claim 9, wherein the received configuration includes a setting that defines a specific geolocation or region in which decryption of traffic is permitted to occur.

14. The non-transitory machine-readable storage medium of claim 9, wherein the intermediary server is in a first data center, and wherein the first data center is one of a plurality of data centers that each include a set of one or more intermediary servers, and wherein the received configuration includes a setting that defines that only an intermediary server that is located in a same data center to which the client network application connects is permitted to load the plurality of third-party tools based on the received information and the configuration.

15. The non-transitory machine-readable storage medium of claim 9, wherein the received information includes a screen resolution of the client network application.

16. The non-transitory machine-readable storage medium of claim 9, wherein the received information is received as a result of a configured interaction occurring with the page.

* * * * *